(No Model.)
M. F. THAYER & J. S. SMITH.
RAKE.
No. 322,022. Patented July 14, 1885.
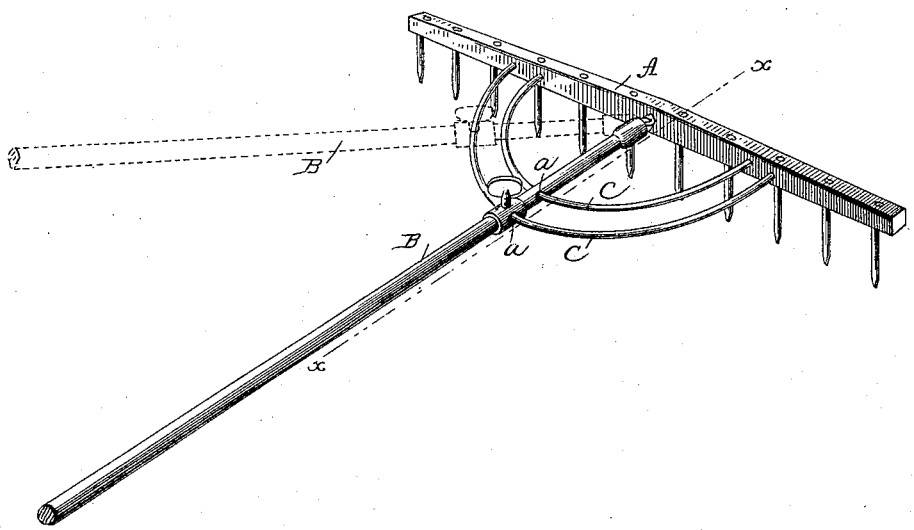
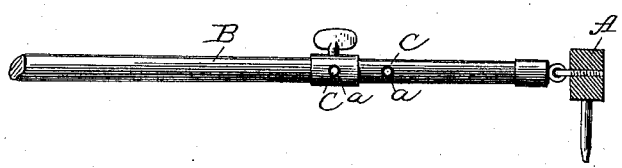
WITNESSES:
INVENTOR
Marion F. Thayer
John S. Smith
BY
ATTORNEY

UNITED STATES PATENT OFFICE.

MARION F. THAYER AND JOHN S. SMITH, OF WESTBOROUGH, MASS.

RAKE.

SPECIFICATION forming part of Letters Patent No. 322,022, dated July 14, 1885.

Application filed October 8, 1884. (No model.)

*To all whom it may concern:*

Be it known that we, MARION F. THAYER and JOHN S. SMITH, of Westborough, in the county of Worcester and State of Massachusetts, have invented a new and useful Improvement in Rakes; and we do hereby declare that the following is a full, clear, and exact description of the same.

Our invention relates to rakes, and is an improvement on that class of rakes usually made of wood, adapted to be used in raking and handling hay.

The object of the invention is to make the handle adjustable at any angle to the rake-head, and in such a manner that the adjustable feature may be applied to the rakes, as ordinarily constructed, without material change in the rake structure, and without the addition of any parts which would tend to add to the expense of the article.

Heretofore it has been proposed in garden-rakes to pivot the handle to the rake-head, so as to allow of the adjustment of the same; but such an arrangement as was therein shown is not practicable for the purposes of our invention, as the handle was pivoted to a plate, and had no further support but at the point where it was pivoted. In the present invention, where the rake is designed to not only rake but to lift the hay after being raked, it is absolutely necessary that the handle shall have support at a distance from the point of pivoting.

Another advantage in our invention lies in the cheapness with which they can be made and the ease with which an ordinary wooden rake can be changed to include our invention.

In the drawings accompanying this, Figure 1 represents a perspective view of an ordinary rake embodying our improvements. Fig. 2 is a section of the same on the line *x x* of Fig. 1.

In the wooden rakes used for raking hay it has been customary to form the handles rigid. This arrangement is desirable while the hay is being raked into piles; but these rakes are in many cases used to throw the hay into large piles or into a barn window or some elevated position, acting in the capacity of a pitchfork. In this use the rigid handle at right angles to the head is objectionable, for the reason that it interferes with perfect freedom in throwing the hay.

The object of our invention is to pivot the handle to the head and form guides at a suitable distance from the head to support the handle; and in this way, when it is desired to use the rake as above described, the handle is set at a suitable angle, and the operator thus stands to one side of the load and can operate the rake easily and quickly.

In the drawings an ordinary rake-head is shown at A, and to this is pivoted the handle B at the center of the head. The pivot we prefer to use consists of two screw-eyes, one secured to the rake-head and the other to the handle end, making a simple and easy-working pivot.

C C represent the curved braces which are ordinarily used on rakes of this class. At the points where the handle meets these braces holes are bored, as at *a a*, through which the braces pass, and upon these braces, with the pivot as a center, the handle swings. A set-screw is secured in a collar upon the handle with the screw adapted to bear upon the brace C, whereby the handle may be set to any position and held in place.

Another advantage gained by this invention is, greater ease and convenience in ordinary raking into a windrow. When the handle is set at a slight angle and is held with the acute angle nearest the person, the rake can be handled with less strain and the hay is better kept from being in front of the feet. The handle being bent toward the person, the head is naturally and easily drawn farther than usual from the feet, and the hay kept out of the way.

In the construction shown the rake-head is but little weakened in the center, as the hole in which the metallic screw is inserted is much smaller than it would be were the handle fitted to it.

It will be understood that any of the parts subjected to wear may be bound with metal, or protected in any suitable way.

Having thus described our invention, what we claim is—

1. In a rake of the class described, the head

A, the handle B, pivoted thereto, and the braces C C, serving as guides and supports, substantially as described.

2. In a rake of the class described, the head A, the handle B, pivoted by eyebolts to each other, the guide-braces C C, and the set-screw, substantially as described.

In testimony whereof we have signed our names to this specification in the presence of two subscribing witnesses.

MARION F. THAYER.
    JOHN S. SMITH.

Witnesses:
 W. TROWBRIDGE FORBES,
 HENDERSON ROSS.